March 6, 1951 P. H. TRICKEY 2,544,571
WOUND ROTOR INDUCTION MOTOR WITH
AUTOMATIC SHORT-CIRCUITERS
Filed March 11, 1948 2 Sheets-Sheet 1

INVENTOR
Philip H. Trickey
BY William P. Stewart
ATTORNEY

WITNESS
N. Leszczak

March 6, 1951  P. H. TRICKEY  2,544,571
WOUND ROTOR INDUCTION MOTOR WITH
AUTOMATIC SHORT-CIRCUITERS
Filed March 11, 1948  2 Sheets-Sheet 2

WITNESS
N. Lesgczak

INVENTOR
Philip H. Trickey
BY William P. Stewart
ATTORNEY

Patented Mar. 6, 1951

2,544,571

UNITED STATES PATENT OFFICE 2,544,571

WOUND ROTOR INDUCTION MOTOR WITH AUTOMATIC SHORT-CIRCUITERS

Philip H. Trickey, North Plainfield, N. J., assignor to The Singer Manufacturing Company, Elizabeth, N. J. a corporation of New Jersey Application March 11, 1948, Serial No. 14,376

2 Claims. (Cl. 318—236)

This invention relates to induction motors, particularly the type which employs means for changing the rotor winding resistance to obtain a high starting torque and still maintains a low full-load slip.

It is known to employ double rotor windings with electrical and/or mechanical means to make one or both windings effective, as desired. The prior structures for accomplishing this have many disadvantages among which may be mentioned:

1. Special double-slot laminations requiring expensive dies and not suitable for small diameters.
2. Slip rings, brushes and special external switching devices which are bulky, expensive and require servicing.
3. Special centrifugal switching devices and end connections which, unfortunately, tend to increase the size of the units and raise the problem of contact resistance.

The present invention has for its primary object the provision of a wound rotor structure for an induction motor so designed and constructed that, by using standard production parts, the advantages of high starting torque and low full-load slip are obtained in a single motor.

A further object of the invention is the provision of an ordinary repulsion motor commutator and short-circuiter to automatically effect a winding connection change within an induction rotor, responsive to speed.

A still further object of the invention is the provision of two windings for the rotor of an induction motor with means for automatically changing their relative connections without the use of sliding connections.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
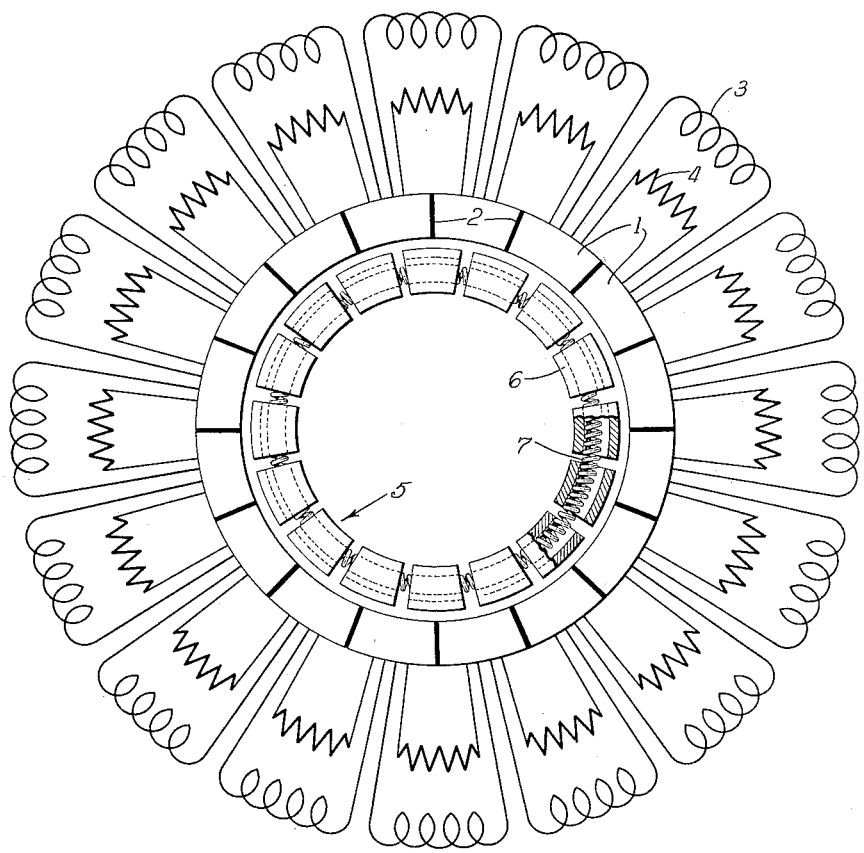
Fig. 1 is a schematic illustration of an induction motor rotor embodying the invention.

Referring to Fig. 1, 1 represents the conducting segments of a conventional commutator with insulation 2 between the adjacent segments. Individual coils 3 of a relatively low resistance winding occupy the longitudinal slots of the rotor periphery in conventional fashion and are connected to adjacent commutator bars as shown. As thus constructed, the coils are not normally individually closed on themselves and thus do not constitute a rotor capable of producing torque by induction motor action. To remedy this condition, a second winding of coils 4 is employed. This winding has, by design, considerably more resistance than the winding of coils 3 and is arranged with its individual coils connected to adjacent commutator bars. It will be seen that the individual coils 3 and 4 form a polyaxial series of closed loops of high resistance and thus satisfy the rotor condition for high starting torque as an induction motor. While it is preferable to employ coils 4 actually wound in the rotor slots, it may be convenient to use resistors in place of the coils 4 and these may be positioned at any convenient point on the rotor.

A conventional short-circuiting device 5 is represented by a series of conducting segments 6 which are connected together electrically and may be arranged, for example, on a garter spring 7 to move into and out of engagement with the commutator bars 1, responsive to rotor speed. This device 5, for example, may be of the type shown and described in U. S. Patent No. 1,737,538. When the short-circuiter is in engagement with the commutator, the high-resistance coils 4 are effectively short circuited by the conducting segments 6 and the coils 3 are also effectively closed on themselves through the path provided by the conducting elements of the short-circuiting device 5. This low resistance condition is productive of desirably low slip and high-efficiency under load conditions.

Figure 3:
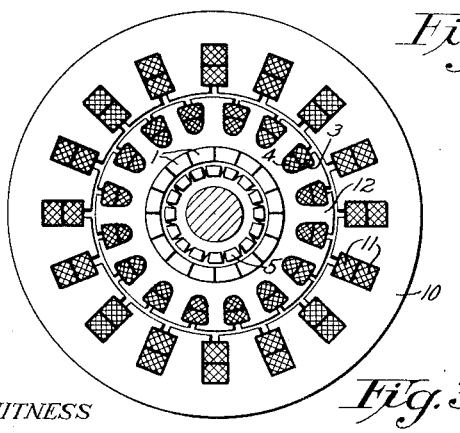
Fig. 3 is a transverse section through an induction motor embodying the invention.

Referring now to Fig. 3, a stator core 10 is formed with longitudinal slots in which are carried stator windings 11. These windings are conventional polyphase windings and are characterized by having their respective winding axes angularly separated in space around the stator so that when they are connected to a polyphase source of energy, a rotating field is produced which reacts on the rotor to produce starting torque. A rotor core 12 is formed with longitudinal slots in which are carried the rotor windings 3 and 4.

It will be seen that the rotor resembles a repulsion motor rotor in that commutator segments 1 and a short-circuiter 5 are employed, but with the important difference that no brushes and associated structure are necessary.

It is apparent from the above that the construction according to the invention provides a motor having two optimum rotor winding conditions selective responsive to speed. One condition is optimum at start. The other is optimum under load. One important economic advantage is that these optimum conditions are established and selected by combining the parts and manufacturing techniques usually associated with other types of motors. It will be observed that no special punchings or slot shapes are involved and no slip rings, brushes or special external connections or devices are necessary. The rotor construction set forth according to this invention is not limited in its application to any particular kind or type of stator, but may be used with any stator that sets up a magnetic field with a rotating component.

The important differences that set this rotor apart from the prior art rotors are the provision of a polyaxially arranged high resistance winding connected to the commutator bars in such a way as normally to add its resistance, coil-by-coil, in series to that of the regular low resistance winding, together with the provision of simple means for selectively connecting the two windings in circuits formed by coil pairs closed upon themselves through a common path of low resistance.

By winding the high resistance coils into the slots a better distribution of the rotor copper losses under starting conditions is obtained, and the winding that supplies the resistance also supplies part of the flux.

Figure 4:
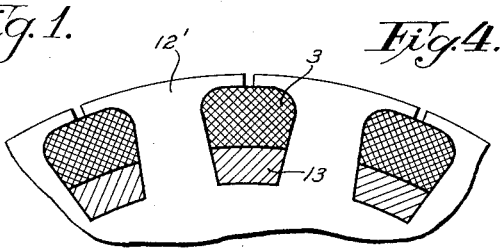
Fig. 4 is an enlarged fragmentary view of a modification of a rotor according to the invention.
Figure 2:
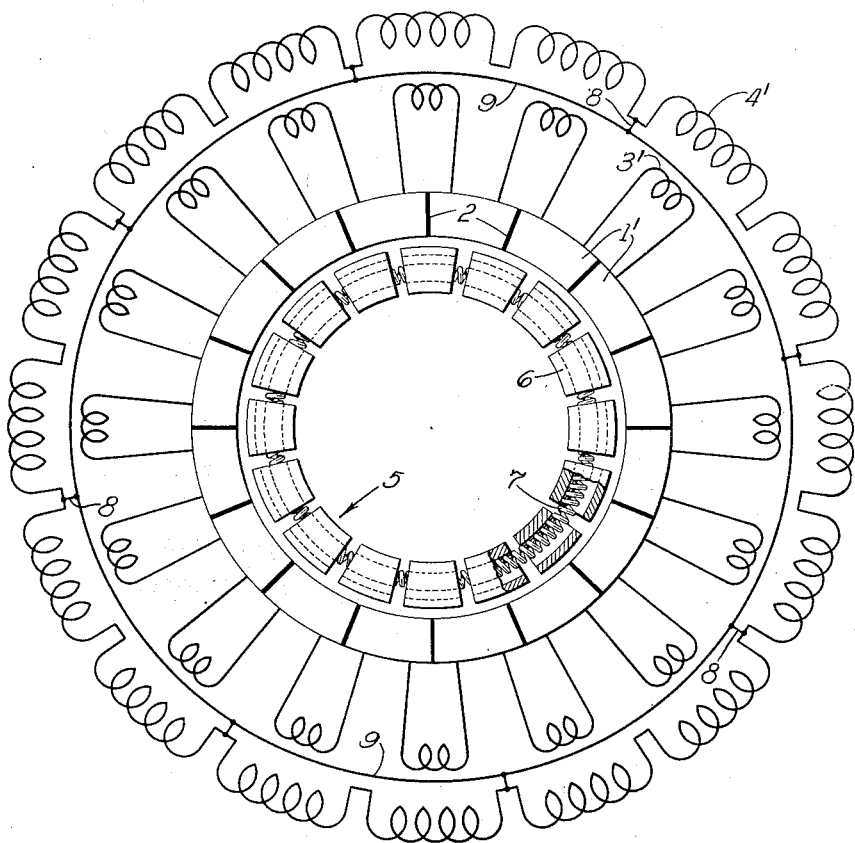
Fig. 2 is a schematic illustration of a modification of the induction motor rotor of Fig. 1.

A modified winding arrangement for producing the double rotor resistance effect is shown in Fig. 2. In this case, a rotor winding comprising coils 4' is electrically independent of the commutator bars 1' and preferably, but not necessarily, has a higher resistance than the winding of coils 3' which are connected to the commutator bars 1'. In fact, the winding of coils 4' may conveniently be of the squirrel-cage variety with end rings, having the conductor bars cast integrally or inserted, as is well known in the art. In the case of the cast winding, it will probably be more convenient to have winding 4' in the bottoms of the slots. This is shown in Fig. 4 wherein 3 denotes the commutated winding and 13 denotes a bar or cast-in winding in the bottom of the slots of a rotor core 12'. Where coils are actually wound in the slots to produce the drum winding 4' it will be necessary to provide current paths as shown, for example, by employing conductors 8 and 9. It will, of course, be evident to those skilled in the art that the winding of coils 4' may, alternatively, be a regular polyphase Y or delta connected winding.

The coils 3' are each connected to adjacent commutator bars 1' in the same manner that the coils 3 are connected to the commutator bars 1 of the arrangement of Fig. 1. In this case, the rotor resistance at standstill is determined solely by the resistance of the winding of coils 4', inasmuch as, the voltages induced in coils 3' are mutually balanced and no current can flow therein to produce torque as long as the short circuiter device 5 is out of engagement with the commutator. The winding of coils 4' may thus be termed the starting winding, and may have a resistance value determined by the desired starting torque.

The short-circuiter device 5 operates to short circuit the commutator bars 1' after the rotor has reached a predetermined speed, as is well known in connection with ordinary repulsion-start, induction-run motors. The individual coils 3', thus closed on themselves, create a series of paths of low resistance uniformly distributed around the rotor and this satisfies the condition for low-slip induction motor action and is productive of high running efficiency. The winding of coils 3' may, therefore, be termed the running winding. The arrangement just described may prove less expensive to make than that of Fig. 1 inasmuch as only one winding need be connected to the commutator bars but both arrangements derive the same advantages from the use of standard production parts already in use for repulsion motors.

The type of rotor above described is of special advantage when used in induction motors built for good operation at all points of its speed-torque characteristic. Motors for automatic control systems, where braking, reversing and plugging are commonly encountered, are particularly good fields of application for these rotors because of the low current demand at low speed obtainable at low cost and without impairing the full-load slip and efficiency.

Having thus set forth the nature of the invention, what I claim herein is:

1. A polyphase induction motor comprising a stator, separate windings on said stator, each winding having an axis displaced angularly from the axes of the other windings, a rotor having a laminated core with longitudinal slots in the peripheral surface thereof, a commutator having insulated conducting segments, a series of winding coils of low resistance and a series of winding coils of high resistance located in said slots, each of said coils being connected to adjacent commutator segments so that a low resistance coil is in series with a corresponding high resistance coil, and means, responsive to a motor condition for electrically connecting all the commutator segments together by a path of negligible electrical resistance.

2. A polyphase induction motor comprising a stator, separate winding elements on said stator, each element having its axis displaced around the stator from the other winding axes, a rotor, a series of high resistance coils and a series of low resistance coils, said coils being arranged polyaxially around said rotor, a commutator having conducting insulated bars, one coil from each of said series of coils being connected to each pair of adjacent bars of said commutator, and means responsive to the rotative speed of said rotor for electrically connecting said bars together.

PHILIP H. TRICKEY.

REFERENCES CITED

The following references are of record in the file of this patent:

UNITED STATES PATENTS

| Number | Name | Date |
|---|---|---|
| 795,861 | Schuler | Aug. 1, 1905 |
| 992,280 | Sparrow | May 16, 1911 |
| 1,256,705 | Le Bovici | Feb. 19, 1918 |
| 1,213,618 | Fynn | Jan. 23, 1917 |
| 1,321,590 | Binney | Nov. 11, 1919 |
| 1,505,619 | Bergman et al. | Aug. 19, 1924 |
| 1,870,302 | Weichsel | Aug. 9, 1932 |
| 1,872,371 | Weichsel | Aug. 16, 1932 |